United States Patent

[11] 3,600,605

[72] Inventor Klaus Lehmann
Nieder-Ramstadt, Germany
[21] Appl. No. 838,049
[22] Filed June 26, 1969
[45] Patented Aug. 17, 1971
[73] Assignee Fernseh GmbH
Darmstadt, Germany
[32] Priority June 29, 1968
[33] Germany
[31] P 17 62 514.8

[54] CIRCUIT FOR MULTIPLYING TWO ELECTRICAL SIGNALS
12 Claims, 2 Drawing Figs.

[52] U.S. Cl. .......... 307/229, 235/194, 307/225, 307/304, 328/143, 328/160
[51] Int. Cl. .......... G06g 7/12, G06g 7/16
[50] Field of Search .......... 307/229, 225, 304; 328/143, 160, 38; 235/184, 194; 330/30 D

[56] References Cited
UNITED STATES PATENTS

| | | | |
|---|---|---|---|
| 3,117,242 | 1/1964 | Slack | 235/194 X |
| 3,373,959 | 3/1968 | Petersen | 235/194 X |
| 3,449,687 | 6/1969 | Knauber et al. | 330/30 (D) |
| 3,469,112 | 9/1969 | Hands et al. | 330/30 (D) X |
| 3,517,178 | 6/1970 | Herndon | 235/194 |

OTHER REFERENCES
Highleyman & Jacob, An Analog Multiplier Using Two Field Effect Transistors, I.R.E. Transactions on Communications Systems, September 1962, pp. 311— 317. 302/229

*Primary Examiner*—Stanley T. Krawczewicz
*Attorney*—Michael S. Striker

ABSTRACT: A circuit for multiplying two electrical signals for use particularly in television. Two field-effect transistors are interconnected with their drain-source paths to form a voltage divider. The video signal is applied to one field-effect transistor, by way of a capacitor and clamping transistor. The gate of this one field-effect transistor is connected to the junction of the two field-effect transistors which serve, at the same time, as the output of the circuit for providing the product of the two electrical signals. The second signal to be multiplied to the video signal is applied to the gate of the other field-effect transistor which has simultaneously a predetermined voltage level applied to it through an adjustable resistor.

Inventor:
Klaus Lehmann
by
Attorney

CIRCUIT FOR MULTIPLYING TWO ELECTRICAL SIGNALS

BACKGROUND OF THE INVENTION

The present invention resides in a circuit arrangement for multiplying two electrical voltages. This problem of multiplying electrical voltage signals appears very often and is a very prevalent problem in electronics. Examples of applications for such multiplying processes of two electronic signals, are amplitude modulation, and amplification relation with special application to television in which signal disturbances are compensated. These signal disturbances appear in a video signal as a result of the variation and sensitivity of the light-sensitive layer of the pickup tube at different locations of the layer. The compensation results from multiplication of the video signal with corresponding line and picture frequency signals. These line and picture frequency signals have usually a sawtooth or parabolically shaped function, so that the black value of the video signal remains unaffected.

A circuit arrangement for multiplying two electrical voltage signals is already known in the art. In this conventional circuit, two emitter-coupled transistors are provided. One of the signal voltages which are to be multiplied, is applied to both emitters from a high ohmic source. The other voltage signal, on the other hand, is applied to the base of one transistor, or to the bases of both transistors with opposite polarity. The product of the two applied signal voltages, is taken from the collector of one transistor, or the collectors of both transistors. If, however, the transistors in this circuit are operated at a point which has a linear transfer function, then all amplitude values of one voltage signal are affected by the amplitude values of the other signal.

Accordingly, it is an object of the present invention to provide a simple circuit arrangement for multiplying two electrical signal voltages, so that one voltage signal is not affected by the amplitude values of the other signal. When applied to video signals, therefore, the black value is not to be affected.

The object of the present invention is achieved through the design of the drain-source paths of a first and second field-effect transistor from a voltage divider. The gate electrode of the first field-effect transistor is connected to the junction of the two field-effect transistors. This junction forms, at the same time, the output of the circuit arrangement. One of the voltage signals is applied to the first field-effect transistor, whereas the other voltage signal to be multiplied is applied to the gate electrode of the second field-effect transistor.

The circuit arrangement of the present invention is of particularly simple design and is constructed so that the amplitude value of a voltage remains unaffected from the multiplication. Thus, when such value corresponds to null or a zero level, the output of the circuit arrangement will provide a zero level or no output, independent of the magnitude that the other signal voltage may possess or assume.

The circuit arrangement of the present invention has further the advantageous features of exhibiting linear characteristics over a wide range, and little dependency of the characteristics upon temperature.

SUMMARY OF THE INVENTION

An arrangement for multiplying two electrical signals with particular application to television. The drain-source paths of two field-effect transistors are connected in series to form a voltage divider. The junction of these two field-effect transistors forms, at the same time, the signal output of the circuit. The first field-effect transistor has its gate connected to this output junction, whereas the video signal is applied to this first field-effect transistor through a capacitor and/or clamping circuit. The clamp may be in the form of a transistor to which clamping pulses are applied at the base electrode. The other signal to be multiplied to the video signal, is applied to the gate of the second electrode by way of another capacitor. A predetermined potential is also applied to the gate of the second field-effect transistor, through the use of an adjustable resistor to which voltages of opposite polarity are applied at the terminals of the resistance winding. An auxiliary resistor may be inserted between the first field-effect transistor and the output junction. In conjunction with this auxiliary resistor, two additional resistors are connected in the circuit. One resistor is connected to the junction between the auxiliary resistor and the field-effect transistor, whereas the other resistor is connected directly to the output junction. Voltages of opposite polarity are, at the same time, applied to the other terminals of these two resistors operating in conjunction with the resistor 13 for causing an auxiliary current to flow through this auxiliary resistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
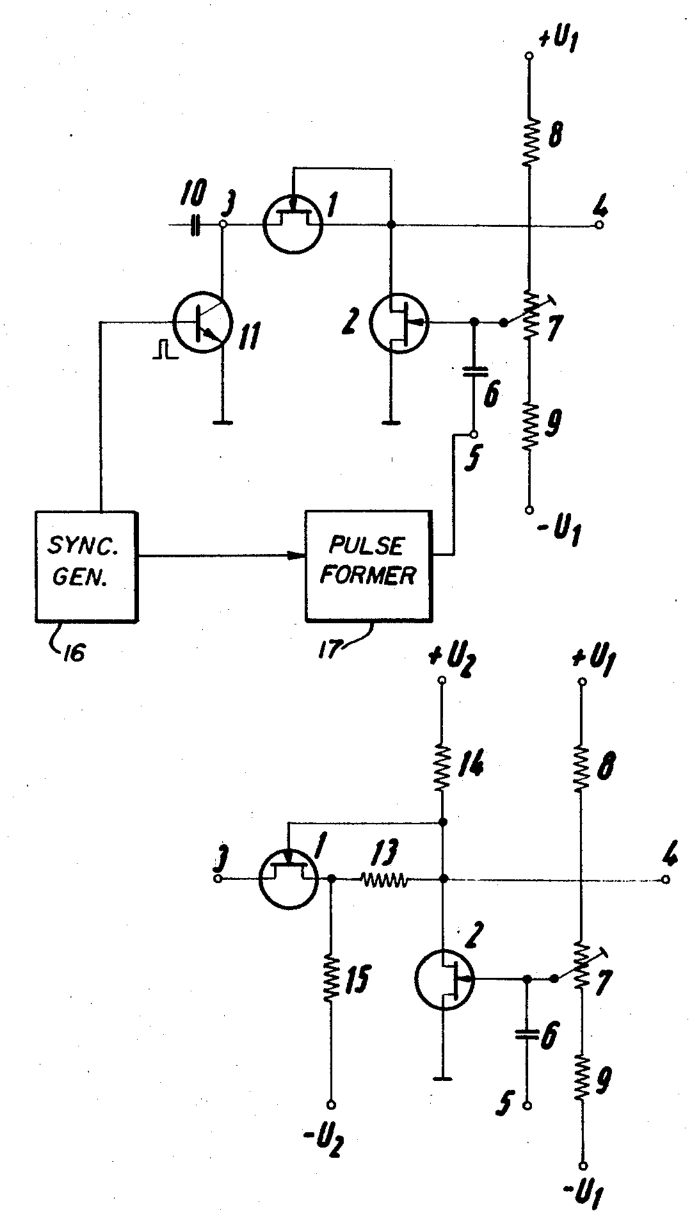
FIG. 1 is an electrical schematic diagram and shows the circuit arrangement for multiplying two electrical signals, in accordance with the present invention.
FIG. 2 is an electrical schematic diagram of another embodiment of the present invention of FIG. 1, in which the resistance of the first field-effect transistor is set.

Referring to the drawing, and in particular, to FIG. 1, two field-effect transistors 1 and 2 form a voltage divider. An input signal is applied to the terminal 3, and is one of the signals which is to be multiplied. A product of the multiplication is taken from the output terminal 4. The second voltage for the multiplication process is, in accordance with a preferred embodiment of the present invention, a periodic recurring signal. Accordingly, this second signal of periodic recurring form can be applied at the terminal 5, and from there to the gate electrode of the field effect transistor 2, by way of capacitor 6. This second signal voltage thereby controls or regulates the resistance of the field-effect transistor 2 and thereby the relationship of the voltage divider from the viewpoint of multiplying the two signal voltages. A basic setting of the voltage divider relationship is achieved through the potentiometer 7 in conjunction with the resistors 8 and 9. The series combination of the winding of resistor 7, as well as the resistors 8 and 9, is applied across voltage potentials $+U_1$ and $-U_1$ having positive and negative polarities with respect to ground potential.

In the aforementioned preferred embodiment applied to television technology, the one voltage signal which is applied to the terminal 3 is a video signal. If this voltage signal does not have a definite DC level, it is required to apply this video signal by way of a capacitor 10 and a clamping circuit, and used in many different forms in television. The clamping circuit is designated in FIG. 1 through the transistor 11. Clamping pulses are applied to the transistor base of this transistor 11 in the conventional manner. Thus, the video signal is applied to the field-effect transistor 1, by way of the capacitor 10 and the clamping transistor 11.

A synchronizing generator 16 is connected to the base of the transistor 11 to supply clamping pulses to the latter. This is conventional. A pulse former 17, producing a parabolically shaped pulse from the output of generator 16, is connected by the capacitor 6 to the gate of the field-effect transistor 2.

Good temperature stability is achieved in the circuitry of the present invention, by providing identically constructed components in both of the voltage divider branches. Precise compensation for the temperature dependency of these components is possible only with equally large source-drain resistances of both field-effect transistors. Experiments have shown, however, that even with deviations from this requirement, the temperature stability of the circuit arrangements will meet practical specifications.

In a further development of the present invention, the resistance of the field-effect transistor 1 may be varied. For this purpose, a resistor 13 is inserted between the field-effect transistor 1 and the output of the circuit of FIG. 2. A resistor 14 is connected to the junction of the resistor 13 and the transistor 2. The opposite terminal of this resistor 14 has a voltage $+U_2$ applied to it. Another resistor 15 has one terminal connected to the junction of the transistor 1 and the resistor 13. The other terminal of this resistor 15 has a negative voltage level applied to it, $-U_2$. Thus, the two resistors 14 and 15 have voltages of opposite polarity applied to them. Through the aid of the resistors 14 and 15, an auxiliary current flows through the resistor 13. The voltage drop appearing across the resistor 13, controls the resistance of the field-effect transistor 1, by way of the gate electrode. The remainder of the circuit arrangement of FIG. 2 is identical to the arrangement of FIG. 1.

It will be understood that each of the elements described above, or two or more together, may also find a useful application in other types of constructions differing from the types described above.

While the invention has been illustrated and described as embodied in multiplying circuits, it is not intended to be limited to the details shown, since various modifications and structural changes may be made without departing in any way from the spirit of the present invention.

What is claimed as new and desired to be protected by Letters Patent is set forth in the appended claims:

1. An arrangement for multiplying two electrical signals comprising, in combination, a first field-effect transistor; a second field-effect transistor connected to said first field-effect transistor so that the drain-source path of said first field-effect transistor is connected in series with the drain-source path of said second field-effect transistor, the series connection of said paths forming a voltage divider the output of which is the junction between said paths; means for connecting the gate electrode of said first field-effect transistor with said junction between said paths; means for applying one of said signals to that electrode of the drain-source path of said first field-effect transistor that is not connected to the drain-source path of said second field-effect transistor; and means for applying the other one of said electrical signals to the gate of said second field-effect transistor, whereby the output at said junction emits a signal corresponding to the product of said two electrical signals.

2. The circuit arrangement for multiplying two electrical signals as defined in claim 1 including a first resistor connected between said first field-effect transistor and said junction.

3. The circuit arrangement for multiplying two electrical signals as defined in claim 2 including a second resistor connected with one terminal to said junction; a third resistor with one terminal connected to the connection between said first field-effect transistor and said first resistor; and means for applying voltages of opposite polarity to the other terminals of said second and third resistors.

4. The circuit arrangement for multiplying two electrical signals as defined in claim 1 wherein one of said electrical signals to be multiplied is a video signal.

5. The circuit arrangement for multiplying two electrical signals as defined in claim 4 including capacitor means connected between said electrode of said first field-effect transistor and said means for applying one of said signals to said electrode of said first field-effect transistor, and wherein said video signal is applied to said first field-effect transistor.

6. The circuit arrangement for multiplying two electrical signals as defined in claim 5 including clamping means connected to said capacitor means for clamping said video signal.

7. The circuit arrangement for multiplying two electrical signals as defined in claim 6 wherein said clamping means comprises a transistor with emitter-collector path connected to said capacitor means.

8. The circuit arrangement for multiplying two electrical signals as defined in claim 7 including means for applying clamping pulses to the base of said transistor for clamping said video signal.

9. The circuit arrangement for multiplying tow electrical signals as defined in claim 1 including capacitor means in said means for applying the electrical signal to the gate of said second field-effect transistor.

10. The circuit arrangement for multiplying two electrical signals as defined in claim 9 including variable resistor means connected to the gate of said second field-effect transistor.

11. The circuit arrangement for multiplying two electrical signals as defined in claim 10 including means for applying voltages of opposite polarity to the resistance winding of said variable resistor means, so that said variable resistor means applies a predetermined voltage level to the gate of said second field-effect transistor.

12. The circuit arrangement for multiplying two electrical signals as defined in claim 10 wherein said variable resistor means comprises a resistance winding having two terminals connected to voltage potentials of opposite polarity; and a sliding arm slidable along said resistance winding and connected to the gate electrode of said second field-effect transistor, whereby a variable voltage level is applicable to the gate of said second field-effect transistor.